June 23, 1970     E. C. MORONI ET AL     3,517,072
HIGH PURITY 2,6-XYLENOL
Filed Oct. 28, 1963
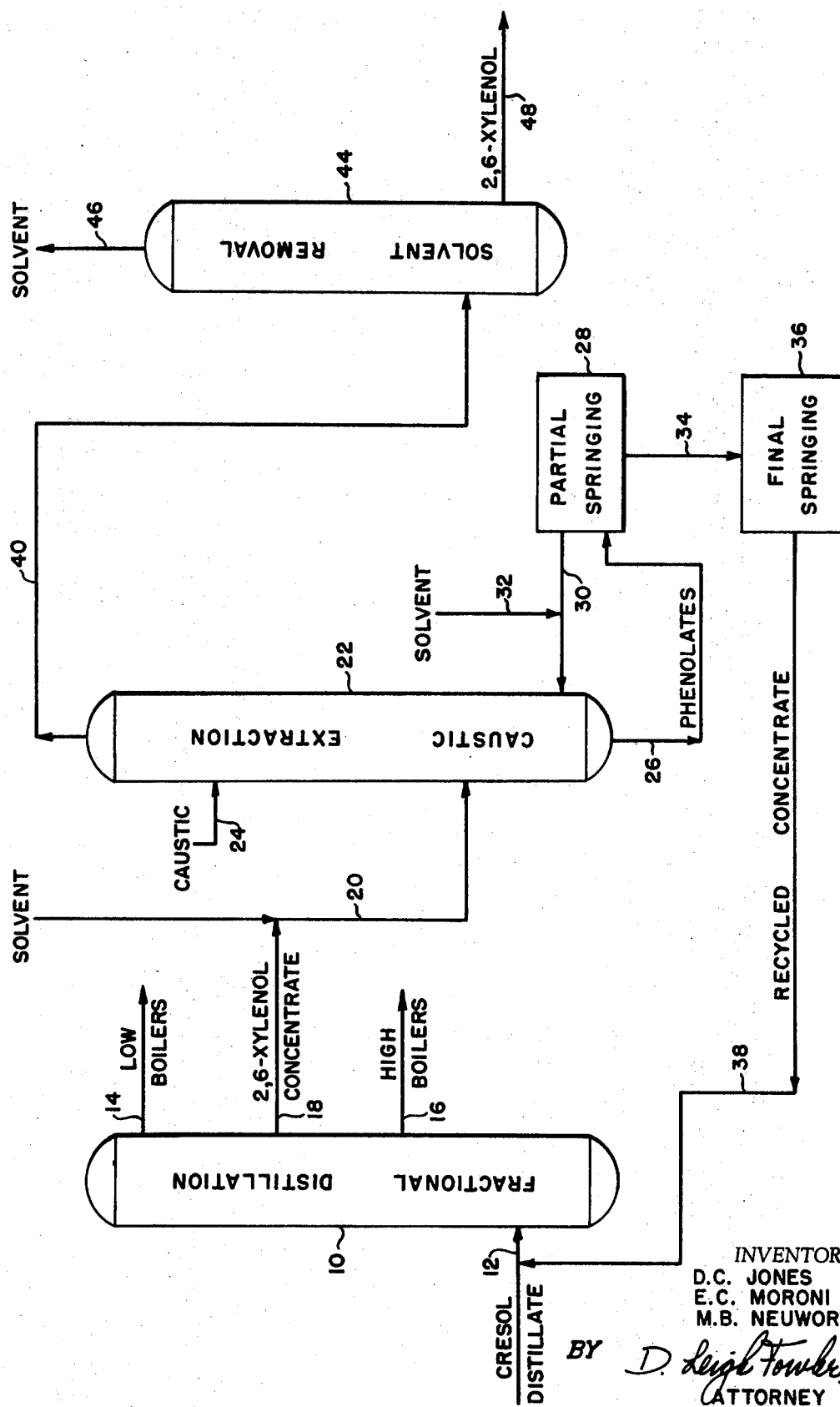
INVENTORS.
D.C. JONES
E.C. MORONI
M.B. NEUWORTH
BY D. Leigh Towler, Jr.
ATTORNEY

United States Patent Office 3,517,072
Patented June 23, 1970

3,517,072
HIGH PURITY 2,6-XYLENOL
Eneo C. Moroni, Bethel Park, and Martin B. Neuworth, Pittsburgh, Pa., assignors, by mesne assignments, to Consolidation Coal Company, Pittsburgh, Pa., a corporation of Delaware
Filed Oct. 28, 1963, Ser. No. 319,399
Int. Cl. C07c 39/06, 37/28
U.S. Cl. 260—621                    5 Claims The present invention relates to a process for separating 2,6 - xylenol (i.e., 2,6 - dimethylphenol) from a mixture of phenols. More particularly, it relates to a process for the separation and recovery of 2,6-xylenol in high purity from its admixture with ortho-cresol and one or more of the following compounds: meta-cresol, para-cresol, 2,4-xylenol, 2,5-xylenol, and ortho-ethylphenol. Still more particularly, the present invention relates to the recovery of 2,6-xylenol which is free of o-cresol from mixtures containing these two compounds.

2,6-xylenol is a naturally occurring phenol amounting to as much as 20 percent of the cresol distillate derived from low-temperature carbonization of bituminous coal. It also occurs in petroleum cresylics, in coke oven tars, oil shale distillates, coal hydrogenation oils and the like. Its boiling temperature is above that of ortho-cresol and below that of metal- and para-cresol. Accordingly, it is concentrated in what is normally termed the cresol distillate, that is, the distillate boiling in the approximate range of 190 to 210° C. at 760 mm.

Not only does 2,6-xylenol appear in naturally occurring phenols, but it also appears in certain reaction products. For example, the isomerization of o-cresol produces significant quantities of 2,6-xylenol. The isomate contains 2,6-xylenol in mixture with meta- and para-cresol products and unreacted ortho-cresol. The catalytic methylation of either phenol or o-cresol provides mixtures containing 2,6-xylenol. For the purposes of this present invention, these reaction products boiling within the range of about 190 to 210° C. are also called cresol distillates.

2,6-xylenol is a valuable material for use in antioxidants, plasticizers and the like. It is also useful as a monomer in the preparation of polymers. (See Journal of the American Chemical Society 81:6335-36 (1959); Journal of Polymer Sciene 58:581-591; idem 58:593-609; and idem 58:469-90.)

The problem of separating 2,6-xylenol in good yield and high purity from cresol distillates becomes apparent upon examination of the following Table I where the boiling points at different pressures are listed for the several components of the cresol distillate.

TABLE I

|  | 20 mm. | 50 mm. | 100 mm. | 760 mm. |
| --- | --- | --- | --- | --- |
| o-Cresol | 90° C | 109° C | 125.5° C | 190.8° C. |
| m-Cresol | 101° C | 120° C | 138° C | 202.2° C. |
| p-Cresol | 101° C | 120° C | 138° C | 202.2° C. |
| 2,4-xylenol | 105° C | 125° C | 143° C | 210° C. |
| 2,5-xylenol | 105° C | 125 °C | 143° C | 210° C. |
| 2,6-xylenol | 95° C | 116° C | 133° C | 202° C. |
| o-Ethylphenol | 101° C | 121.5° C | 138.5° C | 203.7° C. |

In view of the relatively close boiling points of the phenols in the cresol distillate, prior workers have resorted to both physical and chemical methods for separating such mixtures into their components. Successive fractional distillations are described in U.S. Pat. No. 2,409,773. However, the 2,6-xylenol fraction contained at best 60 percent 2,6-xylenol. Fractional azeotropic distillation of close boiling phenolic fractions with water is described in British Pat. 708,925. The concentration of 2,6-xylenol in the richest 2,6-xylenol fraction was only 30 percent. In U.S. Pat. No. 2,789,146, a method is described for separating 2,6-xylenol by double solvent extraction of a cresol distillate. By this method, a yield of 60 to 65 percent of 2,6-xylenol in a concentration of 60 to 90 percent was obtained. The separation of cresols and xylenols by conversion to tertiary butyl phenols and fractional distillation of the products is described by Stevens in Industrial and Engineering Chemistry, Vol. 35, No. 6, pp. 655 to 660. Reconversion to the desired cresol or xylenol is effected by catalytic debutylation. Such a method is obviously expensive. Separation of m-, p-cresols and xylenols has also been achieved by extraction with aqueous alkali. A. Jager, G. Kattwinkel, Brennstoff-Chem. 37:371–375 (1956), see especially footnote on p. 372. The separation was carried out by successive extractions with fresh caustic of the cresol distillate. However, as the authors point out, it is necessary to recrystallize the 2,6-xylenol out of the supercooled mixture of crude acids in the last extract in order to recover "pure" 2,6-xylenol. Furthermore, the successive extractions with fresh caustic greatly reduce the yield of 2,6-xylenol since it, too, reacts with the aqueous alkali.

Accordingly, the primary object of this invention is to provide a method of separating 2,6-xylenol from mixtures of alkyl phenols which will permit recovery of the 2,6-xylenol in commercially acceptable yields (that is, 75% or better) and at purities in excess of 97 percent, and even as high as 99.5 percent or higher.

In accordance with our invention, a mixture of low-boiling alkyl phenols is first obtained which contains at least 35 percent by weight of 2,6-xylenol, and preferably between 35 and 90 percent 2,6-xylenol. This mixture, dissolved in a solvent, is subjected to countercurrent extraction with aqueous alkali metal hydroxide in which the concentration of the alkali metal hydroxide is between 2 and 15 percent by weight and preferably between about 5 and 10 percent. The ratio of moles of alkali metal hydroxide to moles of alkyl phenol (other than 2,6-xylenol) is between 0.9 and 1.5. We have found that 2,6-xylenol is recovered in the solvent stream in yields greater than 75 percent and purities approaching 100 percent, e.g. 99.6 percent, with o-cresol, if present at all, in concentrations of only a few parts per million.

For a better understanding of our invention, its objects and advantages, reference should be had to the following description of the preferred embodiment and to the accompanying drawing in which the preferred embodiment is schematically illustrated.

Referring to the drawing, numeral 10 designates a commercial fractional distillation column having, for example, the equivalent of 50 plates. To this column is fed through a conduit 12 a liquid stream of low-boiling alkyl phenols containing at least 2,6-xylenol and ortho-cresol, together in most instances with meta- and para-cresols and 2,4- and 2,5-xylenols, particularly if the cresol distillate is derived from the usual natural sources. Small amounts of other alkyl phenols such as o-ethylphenol may also be present. The concentration of 2,6-xylenol in this mixture is generally much less than 35 percent, for example, below 15 percent. The fractional distillation column is operated to obtain a 2,6-xylenol concentrate having at least 35 percent 2,6-xylenol and preferably higher, but not more than 90 percent. If a single column does not effect the desired separation, then it is necessary to employ a series of columns in which the 2,6-xylenol is progressively concentrated in the desired fraction. Lower boiling and higher boiling fractions of the feed are withdrawn through conduits 14 and 16 respectively.

The 2,6-xylenol concentrate is withdrawn from the fractional distillation column 10 through a conduit 18 and dissolved, preferably in a hydrocarbon solvent which boils between 60 and 150° C., for example toluene, in a conduit 20. Other solvents which may conveniently be used are benzene, hexane and heptane. The ratio of solvent to concentrate is such as to minimize the final volume of solution and is generally in the range of .1 to 1. The solution is introduced into the lower portion of a vertical countercurrent extraction column 22. At the same time, a solution of aqueous alkali metal hydroxide, preferably sodium hydroxide or potassium hydroxide, is introduced through a conduit 24 into the upper portion of the column. The concentration of the hydroxide is less than 15 percent by weight and preferably between about 5 and 10 percent by weight. The selected solvent is one which has a specific gravity that assures a solution of the cresol distillate lighter than the aqueous caustic solution. The caustic solution being heavier flows downwardly in countercurrent flow relationship to the upwardly moving concentrate solution. The rates of flow of the two oppositely flowing streams are regulated so that the mole ratio of alkali metal hydroxide to the alkyl phenols (excluding the 2,6-xylenol) is between 0.9 and 1.5. As the downwardly flowing caustic solution contacts the upwardly moving phenols, the latter, including the 2,6-xylenol in part at least, are converted to their alkali metal salts. However, the salt of the 2,6-xylenol apparently is quickly reconverted to the xylenol form upon contacting unconverted cresols entering from conduit 20. This conclusion is confirmed by the complete absence of any cresols in the toluene solution leaving the top of the column. Since the concentration of 2,6-xylenol in the solvent steadily increases as the solvent advances up the column, it is desirable to maintain the temperature in the column sufficiently high to prevent crystallization of 2,6-xylenol. A suitable temperature is 50° C. Of course, excess solvent can be used to prevent such crystallization, but additional solvent reduces the throughput and is therefore undesirable.

The downwardly moving stream of caustic solution which consists essentially of the alkyl phenolates is withdrawn from the bottom of the column through a conduit 26 to a vessel 28. The latter may be simply a tank in which the aqueous phenolate solution is partially sprung, that is, partially converted to phenols by the addition of $CO_2$ or other acid. Two phases are thereby formed in the vessel, the lighter phase consisting of the phenols, and the heavier phase of the unconverted phenolates. The phenol phase is recycled to the lower portion of the column 22 through a conduit 30 after being redissolved in solvent added through conduit 32. Such recycle simulates reflux and significantly improves the recovery of high purity 2,6-xylenol.

The heavier phase consisting essentially of unsprung phenolates is conducted from vessel 28 through a conduit 34 to a second vessel 36 wherein the phenolates are completely converted to phenols by $CO_2$ or other suitable acid. The sprung phenols, if sufficient 2,6-xylenol is present, may be recycled through a conduit 38 to the feed input conduit 12.

The toluene solution in the extraction column 22 is withdrawn through a conduit 40 to a solvent removal column 44. The solvent is separated from the 2,6-xylenol by fractional distillation. The solvent is withdrawn through a conduit 46 and the pure 2,6-xylenol through a conduit 48.

Instead of a continuous extraction system as shown, a multi-stage countercurrent system may be employed, that is, a system in which the two streams flow countercurrently through a series of extraction zones or stages.

EXAMPLE

A cresol distillate derived from petroleum and having the following composition A was fractionally distilled in a 50-plate fractioning column to yield an intermediate boiling fraction having the following composition B.

COMPOSITION

| | A (percent by wt.) | B (percent by wt.) |
|---|---|---|
| Phenol | 0.6 | |
| o-Cresol | 24.8 | 13 |
| 2,6-xylenol | 13.5 | 45 |
| m,p-Cresol | 55.2 | 41 |
| o-Ethylphenol | 2.0 | 1 |
| 2,4- 2,5-xylenol | 3.8 | |
| 2,3-xylenol | 0.1 | |

The yield of 2,6-xylenol from the fractional distillation step was about 65% of that fed to the column. If the product having composition B is subjected to continued and successive fractional distillations in a 50-plate column to obtain 2,6-xylenol of high purity, i.e. 99% or higher, the yield approaches the vanishing point, and clearly is uneconomical commercially. If, instead of such successive fractional distillations, the product of composition B is subjected in a solvent to countercurrent extraction with aqueous sodium hydroxide in accordance with our invention, a yield of 81% of 99.7% 2,6-xylenol is obtained. The operating conditions and results of such treatment are shown in Table II below under Run No. B.

The following Table II summarizes the conditions and results of a few runs selected to show the yield and purity of 2,6-xylenol as a function of concentration of the 2,6-xylenol in the cresol distillate feedstock when the caustic extraction is conducted under otherwise optimum conditions. The solvent employed was toluene and the alkali metal hydroxide was sodium hydroxide. The term "contaminants" refers to the alkyl phenols present in the feedstock other than 2,6-xylenol.

TABLE II

| | Run No. | | | |
|---|---|---|---|---|
| | A[1] | B[2] | C[3] | D[4] |
| Percent by wt. of 2,6-xylenol in feed | 13.5 | 45.0 | 54.0 | 80.0 |
| Conc. NaOH | 5.0 | 5.0 | 5.0 | 5.0 |
| Moles NaOH/moles contaminants | 0.98 | 0.97 | 1.11 | 1.4 |
| Temp. of extraction, °C | 50 | 50 | 50 | 50 |
| Sp. gr. organic feed (inc. solvent) | 1.01 | 0.988 | 0.977 | 0.960 |
| Sp. gr. NaOH soln | 1.05 | 1.05 | 1.05 | 1.05 |
| Total organic feedrate inc. solvent, cc./min | 7.17 | 5.0 | 7.1 | 9.3 |
| Yield of 2,6-xylenol | 0 | 80 | 81 | 80 |
| Purity of 2,6-xylenol | | 99.7 | 97.3 | 99.0 |
| Percent o-Cresol | | 0 | 0 | 0 |
| Percent m,p-Cresol | | 0 | 0 | 0 |
| Percent 2,4- 2,5-xylenol | | | 2.7 | 1.0 |
| Percent o-Ethylphenol | | 0.3 | | |

[1] The composition by weight of feedstock (exclusive of solvent) in Run A was as follows: 2,6-xylenol, 13.5%; phenol, 0.6%; o-cresol, 24.8%; m,p-cresol, 55.2%; o-ethylphenol, 2%; 2,4- 2,5-xylenol, 3.8%; and 2,3-xylenol, 0.1%.
[2] The composition by weight of feedstock (exclusive of solvent) in Run B was as follows: 2,6-xylenol, 45%; o-cresol, 13%; m,p-cresol, 41%; and o-ethylphenol, 1%.
[3] The composition by weight of feedstock (exclusive of solvent) in Run C was as follows: 2,6-xylenol, 54%; o-cresol, 39%; and 2,4- 2,5-xylenol, 7%.
[4] The composition by weight of feedstock (exclusive of solvent) in Run D was as follows: 2,6-xylenol, 80%; o-cresol, 13%; m,p-cresol, 6%; and 2,4- 2,5-xylenol, 1%.

It will be noted upon examination of Table II that (1) No recovery of 2,6-xylenol was obtained when the concentration of 2,6-xylenol in the feed was 13.5 percent;

(2) Recovery of high purity 2,6-xylenol in amounts of about 80 percent was achieved when the concentrations of 2,6-xylenol in the feed were 45, 54 and 80 percent respectively;

(3) The 2,6-xylenol recovered in Runs B, C and D was free of o-cresol.

It will also be noted in Table II that the concentration of sodium hydroxide in each of the four runs was 5 percent by weight. We have found this concentration to be optimum within the critical range of concentrations, i.e. between 2 and 15 percent. As the concentration of alkali metal hydroxide is increased above 5%, the recovery of 2,6-xylenol drops, and at an accelerated rate as it reaches 15%. For example, in one instance we obtained 90% recovery of 2,6-xylenol using 5% sodium hydroxide; 80% recovery using 10% sodium hydroxide; and only 60% recovery using 20% sodium hydroxide. Thus, while the purity of the product 2,6-xylenol was the same, the reduction in percent recovery was such as to drastically affect the economics of the process. This reduction in recovery is probably explained, after the fact, by the increasing solvent power of the alkali metal phenolates for the 2,6-xylenol as the concentration of the phenolate solution increases.

In the case of cresol distillates which consist essentially of 2,6-xylenol and o-cresol, with or without m,p-cresols, we have found that we can, by our process, recover 2,6-xylenol in almost 100% purity. That is, it is extremely difficult to detect any contaminants by available methods of analyses. The freezing point of the 2,6-xylenol thus obtained is 45.5° C. Such a pure 2,6-xylenol is extremely valuable for use as a monomer in the aforementioned polymerization reactions since it is well known that any foreign molecules function as chain stoppers and the like and thus impair the properties of the desired polymers.

In the case of cresol distillates which contain 2,4-xylenol, 2,5-xylenol, or o-ethylphenol, it is desirable to first separate them from the cresol distillate, as by fractional distillation, at least to the level of the permissible percent of contaminants in the ultimate product, 2,6-xylenol. Otherwise, they will have to be removed from the 2,6-xylenol after the caustic extraction by such means as fractional distillation or fractional crystallization with consequent reduction in the recovery of 2,6-xylenol.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:
1. The process of obtaining 2,6-xylenol in high yield and purity which comprises obtaining a cresol distillate fraction consisting essentially of 2,6-xylenol and at least one cresol and containing at least 35 percent by weight 2,6-xylenol, subjecting a solution of said distillate fraction in a hydrocarbon solvent which boils between 60 and 150° C. to countercurrent extraction with an aqueous solution of an alkali metal hydroxide in an extraction zone, the concentration of alkali metal hydroxide in said aqueous solution as fed to the extraction zone being between 2 and 15 percent by weight and the ratio of moles of alkali metal hydroxide in said aqueous solution as fed to the extraction zone to the moles of said alkyl phenols other than 2,6-xylenol being between 0.9 and 1.5, maintaining a temperature of the extraction zone sufficiently high to assure retention of the 2,6-xylenol in the solvent phase while in the extraction zone, and recovering 2,6-xylenol from the extraction zone in the solvent phase.

2. The process according to claim 1 wherein the cresol distillate fraction is one consisting essentially of 2,6-xylenol and at least one cresol and containing between 35 and 90 percent by weight 2,6-xylenol.

3. The process according to claim 1 wherein the hydrocarbon solvent is one selected from the class consisting of toluene, benzene, hexane, and heptane; and the alkali metal hydroxide is sodium hydroxide.

4. The process according to claim 3 wherein the solvent is toluene, and the sodium hydroxide has a concentration between about 5 and 10 percent by weight in said aqueous solution.

5. The process according to claim 4 wherein the extraction zone is contained in a vertical column; the toluene solution of the cresol distillate fraction is passed upwardly in countercurrent relationship to the downwardly flowing aqueous solution of said sodium hydroxide in said vertical column; aqueous phenolate solution is withdrawn from the bottom of said column; a part of the phenolates in said aqueous phenolate solution is converted to the corresponding phenols and said part is recycled to the lower portion of said column.

References Cited
UNITED STATES PATENTS 2,581,406   1/1952   Golumbic et al. ____ 260—621

OTHER REFERENCES

Walker, Industrial and Chemical Engineering, vol. 42, No. 6, pp. 1226–1230, June 1950.

Golumbic et al., Journal of the American Chemical Society, vol. 71, pp. 2624–2629, August 1949.

LEON ZITVER, Primary Examiner

N. P. MORGENSTERN, Assistant Examiner

U.S. Cl. X.R.

260—627